United States Patent
Jaeker et al.

(10) Patent No.: US 11,217,973 B2
(45) Date of Patent: Jan. 4, 2022

(54) GUIDE DEVICE FOR A LINE

(71) Applicant: IGUS GMBH, Cologne (DE)

(72) Inventors: Thilo-Alexander Jaeker, Sankt Augustin (DE); Frank Blase, Bergisch Gladbach (DE); Jan Hoffman, Bonn (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 16/652,053

(22) PCT Filed: Sep. 24, 2018

(86) PCT No.: PCT/EP2018/075811
§ 371 (c)(1),
(2) Date: Mar. 29, 2020

(87) PCT Pub. No.: WO2019/063485
PCT Pub. Date: Apr. 4, 2019

(65) Prior Publication Data
US 2020/0251889 A1  Aug. 6, 2020

(30) Foreign Application Priority Data

Sep. 28, 2017  (DE) ............... 20 2017 105 927.8

(51) Int. Cl.
*F16G 13/16* (2006.01)
*H02G 3/04* (2006.01)
*H02G 11/00* (2006.01)

(52) U.S. Cl.
CPC .......... *H02G 3/0437* (2013.01); *F16G 13/16* (2013.01); *H02G 11/006* (2013.01)

(58) Field of Classification Search
CPC ..... H02G 3/0437; H02G 11/006; F16G 13/16
(Continued)

(56) References Cited

U.S. PATENT DOCUMENTS 5,014,506 A    5/1991  Moritz
5,067,678 A *  11/1991 Henneberger ....... H02G 3/0608
                                                   248/68.1

(Continued)

FOREIGN PATENT DOCUMENTS

CN       1747269        3/2006
CN       101567532     10/2009
(Continued)

OTHER PUBLICATIONS

International Search Report from corresponding PCT Appln. No. PCT/EP2018/075811, dated Jan. 3, 2019.
(Continued)

*Primary Examiner* — Timothy J Thompson
*Assistant Examiner* — Michael F McAllister
(74) *Attorney, Agent, or Firm* — Grossman, Tucker, Perreault & Pfleger, PLLC

(57) ABSTRACT

A guide device for a cable, in particular for an energy chain, consisting, at least in one region, of laterally opposing wall elements integrally formed from plastic, wherein at least two directly adjacent wall elements have securing means integrally formed on their facing front-side end regions, which securing means cooperate with one another in such a way that a movement of the two directly adjacent wall elements relative to one another in their longitudinal direction can occur over a predetermined limited path.

17 Claims, 4 Drawing Sheets

(58) Field of Classification Search
USPC .......................................................... 174/97
See application file for complete search history.

(56) References Cited

U.S. PATENT DOCUMENTS

| | | | | |
|---|---|---|---|---|
| 6,470,129 | B1* | 10/2002 | Wentworth | H02G 3/0437 385/134 |
| 6,603,073 | B2* | 8/2003 | Ferris | H02G 3/0608 174/481 |
| 6,634,491 | B1 | 10/2003 | Specht | |
| 6,984,782 | B2 | 1/2006 | Ikeda et al. | |
| 7,141,737 | B2 | 11/2006 | Nakamura et al. | |
| 7,226,022 | B2* | 6/2007 | Bernard | H02G 3/0608 248/68.1 |
| 7,250,574 | B2* | 7/2007 | Fox | H02G 3/0418 174/101 |
| 7,542,650 | B2* | 6/2009 | Ellison | G02B 6/4459 248/49 |
| 7,637,092 | B2 | 12/2009 | Utaki et al. | |
| 8,789,799 | B2* | 7/2014 | Aninger | A47L 15/4274 248/68.1 |
| 8,950,051 | B2* | 2/2015 | Kampf | H02G 3/0608 29/428 |
| 9,328,795 | B2 | 5/2016 | Blase et al. | |
| 2004/0124321 | A1* | 7/2004 | Kampf | H02G 3/0608 248/68.1 |
| 2011/0013978 | A1 | 1/2011 | Smith et al. | |
| 2017/0222412 | A1 | 8/2017 | Jaeker | |

FOREIGN PATENT DOCUMENTS

| | | |
|---|---|---|
| CN | 202937725 | 5/2013 |
| CN | 103635712 | 3/2014 |
| CN | 205159965 | 4/2016 |
| CN | 205724719 | 11/2016 |
| DE | 29706670 | 6/1997 |
| DE | 19817125 | 10/1999 |
| DE | 10207590 | 10/2002 |
| DE | 10212285 | 11/2002 |
| DE | 102004022938 | 12/2004 |
| DE | 202014103562 | 10/2014 |
| DE | 102014110508 | 1/2016 |
| EP | 0415034 | 7/1990 |
| JP | 64-24711 | 2/1989 |
| KR | 10-0938426 | 1/2010 |
| KR | 20-2012-0005867 | 8/2012 |
| SU | 727916 | 4/1980 |

OTHER PUBLICATIONS

International Preliminary Report on Patentability from corresponding PCT Appln. No. PCT/EP2018/075811, dated Mar. 31, 2020.
English translation of Search Report from related Chinese Appln. No. 201880070317.9, dated May 6, 2021.
Office Action from related Japanese Appln. No. 2020-517474, dated May 11, 2021. English translation attached.

* cited by examiner

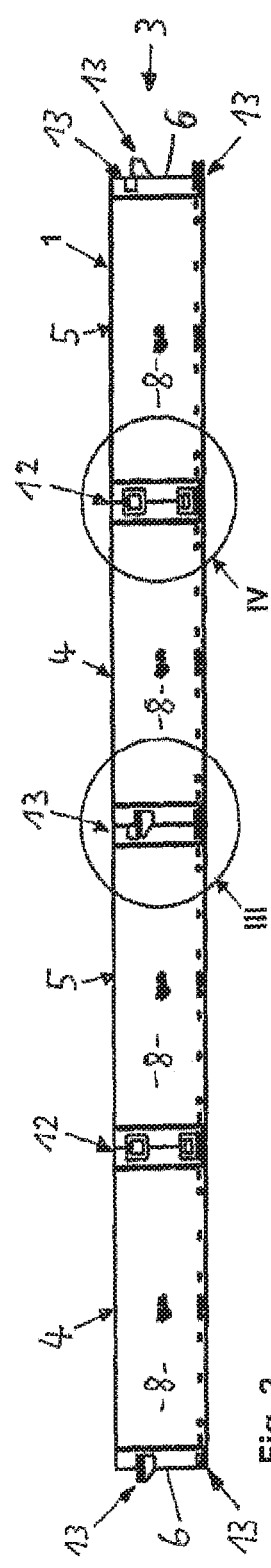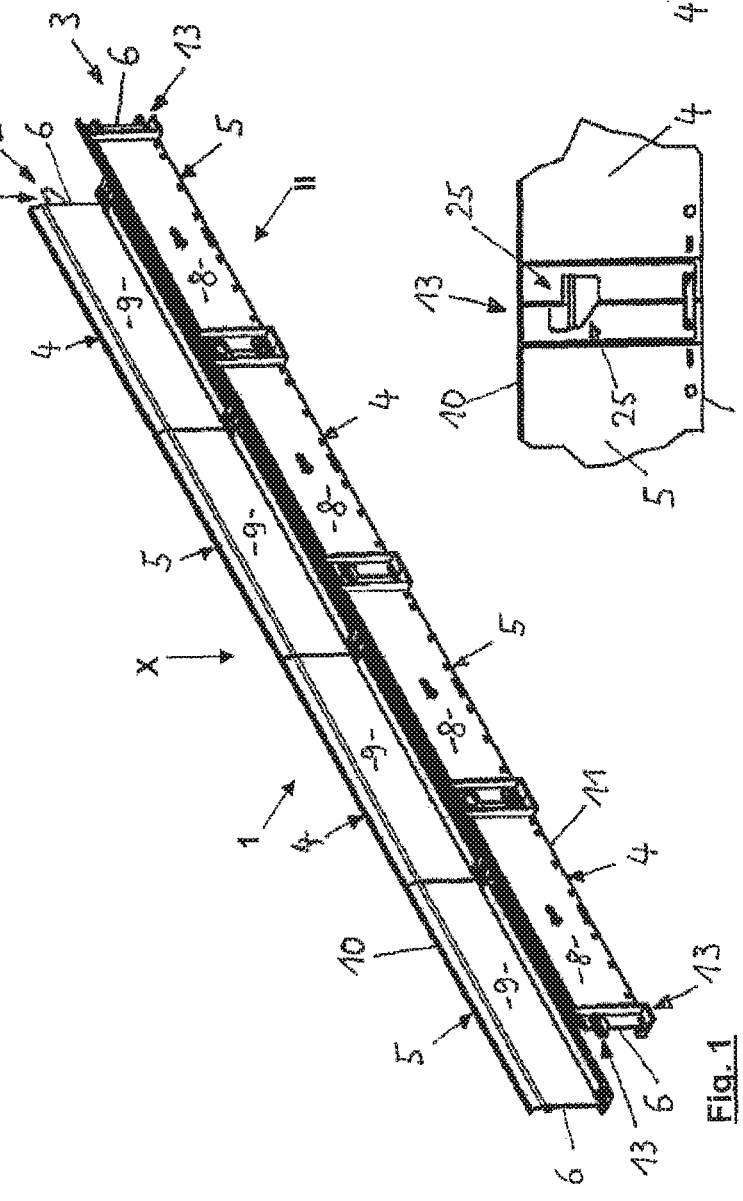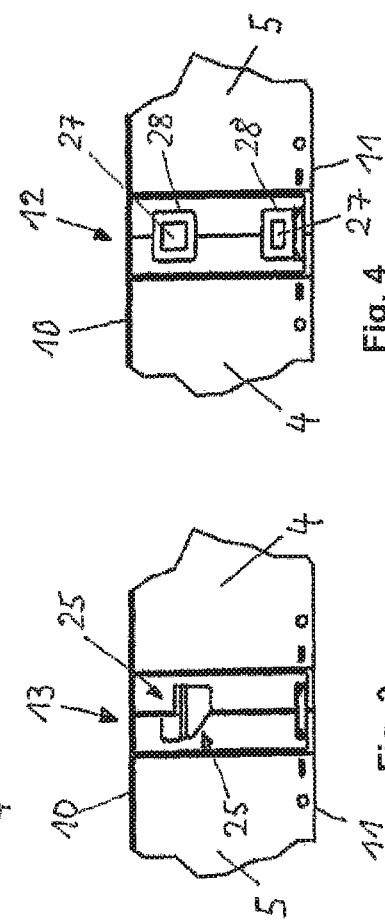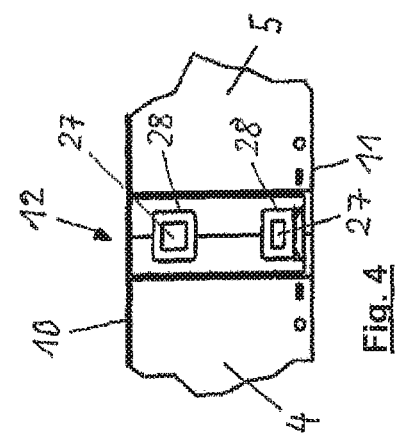

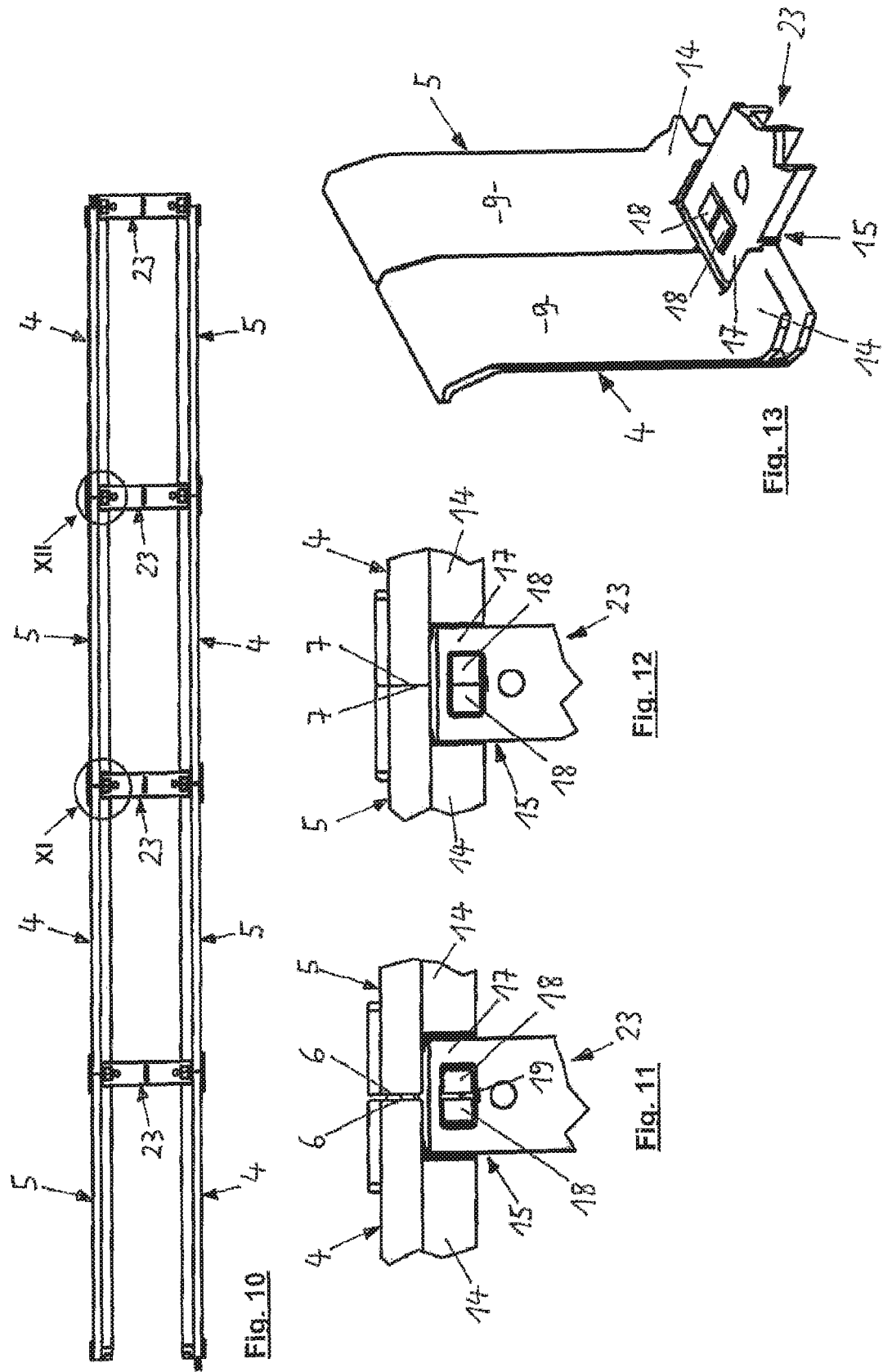

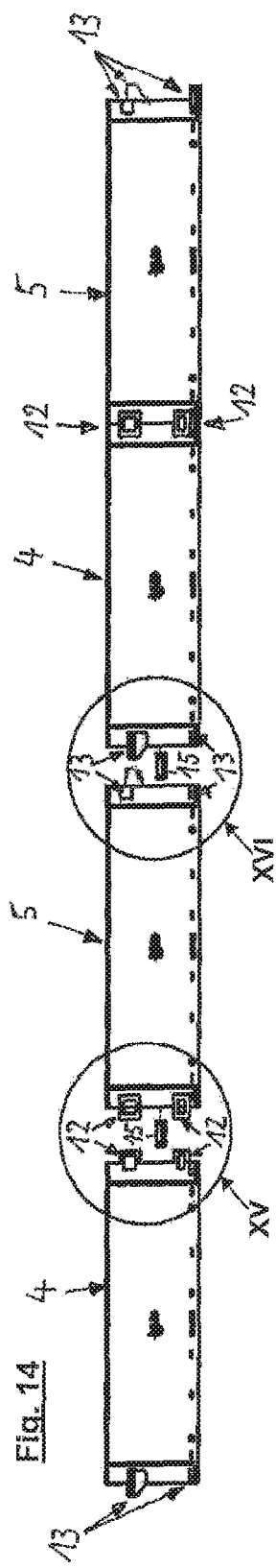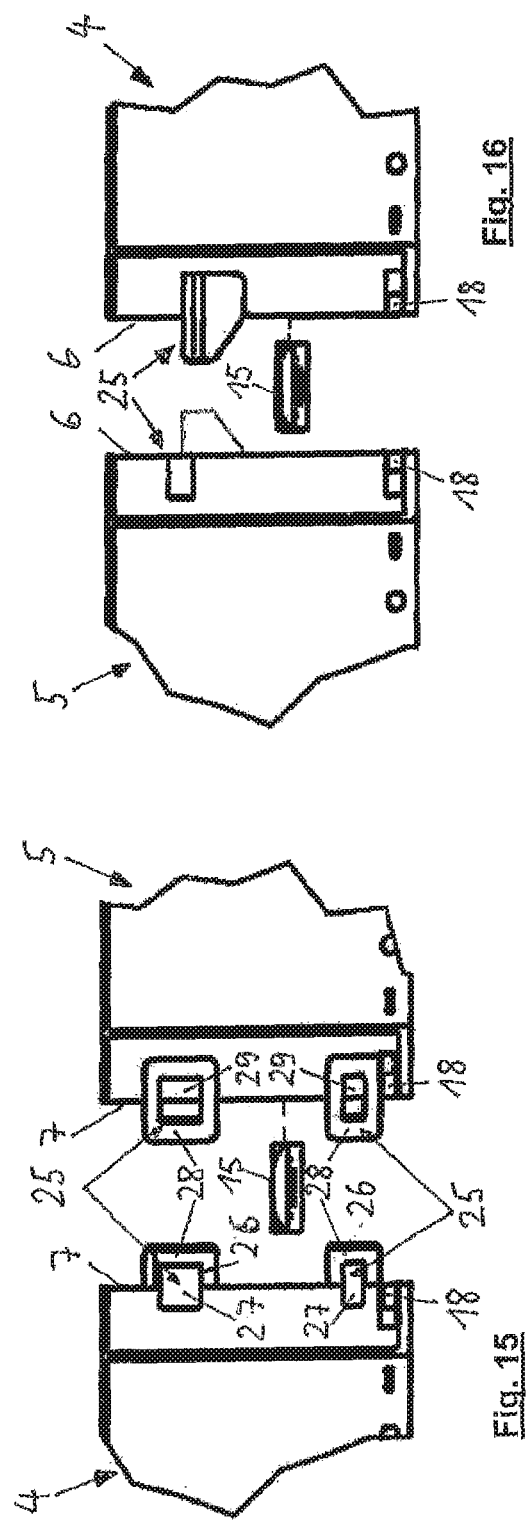

GUIDE DEVICE FOR A LINE

FIELD

The invention concerns a guide device for a line, in particular for an energy guide chain, which is displaceable in such a way that a first run thereof can be positioned over a second run thereof and the two runs are connected together by an arcuate portion, wherein the guide device has laterally mutually opposite guide walls for guiding the first and/or the second run, that at least in a region comprise laterally mutually opposite wall elements which are formed in one piece from plastic and which respectively have two ends facing away from each other in the longitudinal direction of the wall element, an outside which faces away from the laterally mutually opposite wall element, an inside which faces towards the laterally mutually opposite wall element and has a guide region for the line, and a top side and underside narrower with respect to the outside and the inside.

BACKGROUND

A guide device of that kind is known from DE 20 2014 103 562 and is distinguished by its simple manufacture, for example by injection moulding, and simple assembly by fitting and fixing the wall elements to each other. It has been found however that in the case of longer guide devices for guiding longer energy guide chains the assembly known from that publication does not meet up in the optimum fashion to temperature-induced changes in the length of the wall elements and changes in the length of the guide device, due to use thereof.

SUMMARY

Therefore, the object of the invention is to provide a guide device of the kind set forth in the opening part of this specification, such that it compensates for changes in length of the guide device and temperature-induced changes in the individual wall elements.

According to the invention in a guide device of the kind set forth in the opening part of this specification that object is attained in that at least two directly adjacent wall elements at their mutually facing front end regions have integrally formed fixing means which without the interposition of a further fixing means or with the interposition of a further fixing means for fixing the two directly adjacent wall elements to each other cooperate with each other in such a way that a movement of the two directly adjacent wall elements relative to each other in their longitudinal direction can take place over a predetermined limited distance.

The fixing means can be so designed that they block a movement of the directly adjacent wall elements relative to each other transversely to their longitudinal direction.

The fixing means can cooperate with each other in positively locking relationship so that a movement of the two directly adjacent wall elements relative to each other in their longitudinal direction is possible over the predetermined limited distance.

The directly adjacent wall elements can also have at their mutually remote front end regions fixing means which are integrally formed thereon and which without the interposition of a further fixing means or with the interposition of a further fixing means cooperate with fixing means of the wall elements which are directly adjacent at said ends in such a way that a movement of the wall elements relative to each other in their longitudinal direction can take place over a predetermined limited distance.

The wall elements forming the relevant region of the guide device can thus be formed from identical wall elements.

One of the fixing means can have a projection and another of the fixing means can have a recess or an opening, wherein the projection engages into the recess or opening and the width of the recess or opening in the longitudinal direction of the wall elements is greater than the width of the projection so that a movement of the two directly adjacent wall elements relative to each other in their longitudinal direction can take place over the predetermined limited distance.

The directly adjacent wall elements at least at their mutually facing end regions in the region of their underside can have a respective limb or bar on which the projection or the recess or opening is arranged.

The projection can extend perpendicularly to the longitudinal direction of the wall elements and parallel to the inside of the wall elements.

Furthermore, the bar can be arranged at the side of the wall element, that faces from the inside of the wall element into the interior of the guide device, that is to say towards the oppositely disposed guide wall.

The fixing means integrally formed at their mutually facing front end regions can be connected in positively locking relationship by way of an intermediate member as a further fixing means so that a movement of the two directly adjacent wall elements relative to each other in their longitudinal direction can take place over the predetermined limited distance.

The projection can be arranged at the front end of the bar, that is directed towards the directly adjacent wall element, wherein a recess extends around the projection at its side facing towards the inside and away from the end of the wall element, into which the engagement region of the intermediate member engages.

The fixing means can be of such a configuration that the directly adjacent wall elements connected therewith can be released from each other.

The projections in the region of the mutually facing front ends of the directly adjacent wall elements can engage into a recess at the underside of the intermediate member. The width of the recess in that case is greater than the width assumed by both projections when the directly adjacent wall elements bear against each other at their ends. When the mutually facing ends of the directly adjacent wall elements bear against each other the projections can also bear against each other.

The height of the projection formed on the respective bar preferably corresponds to the depth of the recess at the underside of the intermediate member and the depth of the recess extending around the projection in the bar preferably corresponds to the height of the engagement region extending around the recess in the intermediate member, wherein the top sides of the projection, the engagement region and possibly further regions of the bar form a flat contact surface for the line.

The recess provided at the underside of the intermediate member can be in the form of a through opening extending as far as the top side of the intermediate member. In that arrangement the projection can extend to the top side of the intermediate member.

For securing the intermediate member to the mutually facing front end regions of the bars of the directly adjacent wall elements the recesses provided in the bars can at last partially extend under the guide region of the insides of the wall elements and the engagement region of the intermediate member can engage thereunder with a projection.

The projection can be in the form of a spring tongue.

The projection arranged in the relevant front end region of the bar can have at its side remote from the inside of the wall elements a nose, under which when the intermediate member is fixed on the adjacent projections a latching projection arranged in the recess provided at the underside of the intermediate member or the through opening provided in the intermediate member engages. The intermediate member can then be introduced in a suitably inclined position over the projections of the directly adjacent wall elements with its projection in the form of a spring tongue under the insides of the wall elements into the recesses provided in the bars and can then be pivoted into the perpendicular with respect to the wall element, in which case the latching projection latchingly engages under the noses, arranged on the projections, of the latching projection provided in the recess of through opening of the intermediate member in such a way that the two projections have a limited motion play in the longitudinal direction of the wall elements within the recess.

With the above-described fixing the projection which is in the form of a spring tongue can bear resiliently against the underside of the guide regions of the insides of the wall elements.

Preferably the intermediate member is in the form of an end region of an integral transverse member connecting mutually opposite wall elements. Both end regions of the transverse member can then respectively serve as an intermediate member for connecting the fixing means of directly adjacent wall elements in the oppositely disposed guide walls of the guide device.

Additional fixing means can be formed at the relevant mutually adjoining front end regions of the directly adjacent wall elements, said fixing means cooperating in positively locking relationship in such a way that a movement away from each other of the directly adjacent wall elements in the longitudinal direction thereof can take place. The additional fixing elements can be arranged in the upper region of the wall elements and supplement the above-described fixing means arranged in the lower region of the wall elements. They contribute to stabilization of the insides, which are in precisely mutually aligned relationship, of the directly adjacent wall elements, in the entire height thereof.

The additional fixing means can be in the form of groove-and-tongue means and guide the directly adjacent wall elements in their mutually facing front end regions upon the longitudinally directed movement thereof.

The fixing means which are formed at the mutually facing end regions of the directly adjacent wall elements, for longitudinally displaceably securing the directly adjacent wall elements over the predetermined limited distance, can form second fixing means while there can be provided first fixing means which are integrally formed at the mutually remote front end regions of the wall elements and which serve for bearing against and play-free securing at first fixing means of a wall element directly adjacent said end.

The wall elements forming the relevant region of the guide device, with first fixing means in one of their front end regions and with second fixing means in their other front end region can be formed from only two different kinds of respectively identical wall elements, in which case wall elements of different kinds are disposed in opposite relationship in the oppositely disposed guide walls.

The first fixing means in the other front end region of the wall elements which serve for bearing against and play-free fixing at the wall element directly adjacent to said end can be substantially of the configuration like the above-described second fixing means. In that case however the width of the recess provided at the underside of an intermediate member or of the through opening extending through the intermediate member substantially exactly corresponds to the width occupied by the two projections provided at the mutually opposite front end regions. Except for that difference the second fixing means arranged there can be the same as the first fixing means arranged in the region of the other end.

The first fixing means which are provided at the other front end regions of the wall elements and which can include the above-described means can have means for play-free securing of a wall element bearing against that end, by way of the lower region of the wall elements, possibly above a bar which is provided there. The means serve preferably to prevent separation of the relevant directly adjacent wall elements in their longitudinal direction and transversely relative thereto as well as pivotal movement of the wall elements relative to each other in any direction.

The means can be arranged at the outside of the wall elements.

In a preferred configuration the means can be in the form of a projection which projects at the outside and in the region of the relevant front end of the directly adjacent wall element, in the form of a receiving region for receiving the projection. The receiving region can have an opening into which the projection of the directly adjacent wall element engages. The projection can be inserted latchingly into the receiving region and can be arranged therein in positively locking relationship.

The wall elements can be of a substantially identical wall thickness over the entire height of their inside and outside. Their ends can be in the form of flat surfaces, that is to say which do not have any projections, so that the front end regions having the first fixing means bear against each other with their ends over the full surface area and the end regions of the wall elements, that have the second fixing means, can bear against each other with their ends also over the full surface area.

For that purpose, the first and/or the second fixing means which can include the above-described means are arranged to extend laterally outside the ends and outside the guide regions, serving to guide the line, of the insides of the wall elements.

BRIEF DESCRIPTION OF THE DRAWINGS

An embodiment of the present invention is described in greater detail hereinafter with reference to the drawing in which:

FIG. 1 shows a perspective view of a portion of the guide device;

FIG. 2 shows a side view in the direction of the arrow II in FIG. 1;

FIG. 3 shows an enlarged view of the portion III in FIG. 2;

FIG. 4 shows an enlarged view of the portion IV in FIG. 2;

FIG. 10 shows a plan view from above along the arrow X of the portion of the guide device, shown in FIG. 1;

FIG. 11 shows an enlarged view of the portion XI in FIG. 10;

FIG. 12 shows an enlarged view of the portion XII in FIG. 10;

FIG. 13 shows a perspective view of the portion shown in FIG. 11;

FIG. 14 shows a side view of the portion shown in FIG. 1 of the guide device with partly separated wall elements;

FIG. 15 shows an enlarged view of the portion XV in FIG. 14; and

FIG. 16 shows an enlarged view of the portion XVI in FIG. 14.

DETAILED DESCRIPTION

Figure 5:
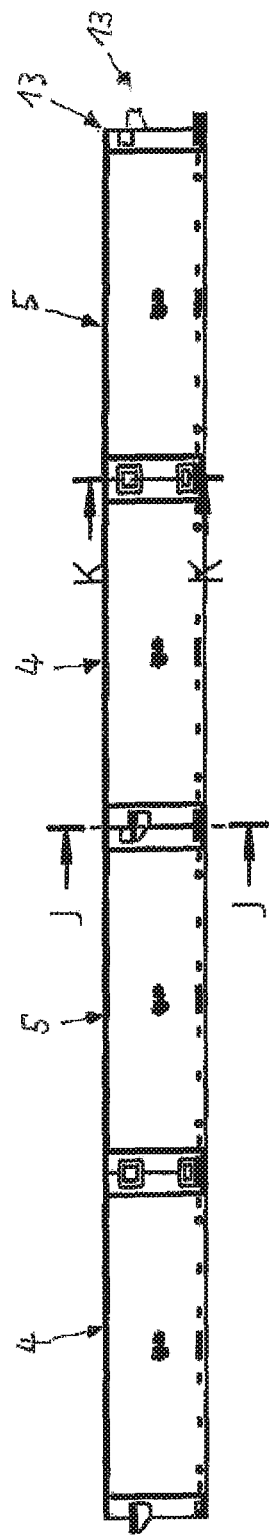
FIG. 5 shows a side view of FIG. 2.
Figure 6:
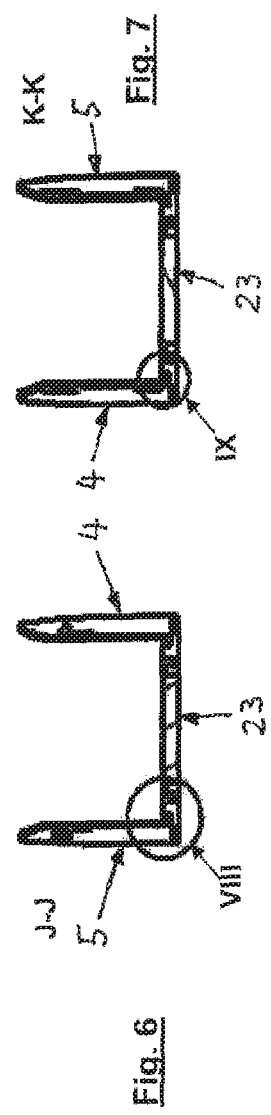
FIG. 6 shows a cross-sectional view along section line J-J in FIG. 5.
Figure 7:
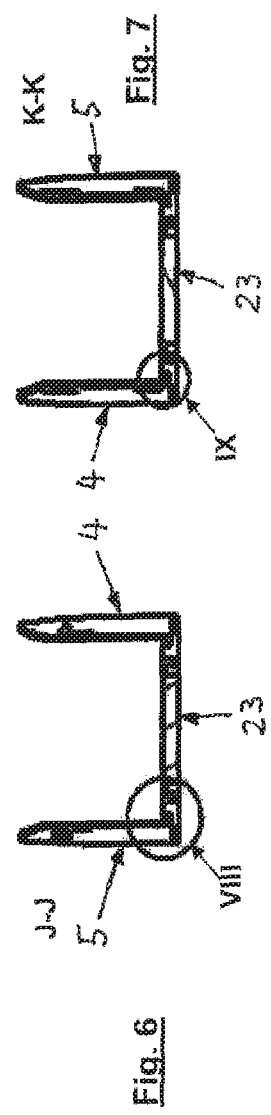
FIG. 7 shows a cross-sectional view along section line K-K in FIG. 5.

The embodiment of a guide device, shown in the drawing as portion 1, is designed for receiving and guiding a line (not shown in the drawing), in particular an energy guide chain, which is displaceable in such a way that a first run thereof can be positioned above a second run thereof and the two runs are connected together by an arcuate portion. The guide device has at least in the illustrated portion 1 laterally mutually opposite guide walls 2 and 3 for guiding the first and/or second run, comprising laterally mutually opposite wall elements 4 and 5 integrally formed from plastic. The wall elements 4 and 5 each have two ends 6 and 7 facing away from each other in the longitudinal direction of the wall element 4, 5 in question, an outside 8 facing away from the laterally mutually opposite wall element 4 and 5 respectively, an inside 9 facing towards the respective oppositely disposed wall element 4 and 5, and a top side and an underside, narrower than the outside and inside 8, 9. In addition in the region of their one end 6 the wall elements 4 and 5 have first fixing means 12 integrally formed thereon for bearing against and play-free fixing of a directly adjacent wall element.

In the region of their other end 7 the wall elements 4 and 5 have integrally formed second fixing means 13 for fixing to a directly adjacent wall element. As further described hereinafter with reference to the drawing the second fixing means 13 permit a movement of the two directly adjacent wall elements 4 and 5 relative to each other in their longitudinal direction over a predetermined limited distance.

As can be seen in particular from FIGS. 1, 2 and 14 the wall elements 4 and 5 forming the relevant region of the guide device are composed of two different kinds of respectively identical wall elements, a first kind of wall elements 4 and a second kind of wall elements 5, wherein wall elements of different kinds are respectively disposed oppositely in the mutually opposite guide walls 2 and 3. The wall elements 4 of the first kind, in the region of their end 7, have first fixing means 12, and in the region of their end 6, second fixing means 13. In the region of their end 6 the wall elements 5 of the second kind have second fixing means 13 which cooperate with the second fixing means 13 of the wall element 4, and in the region of the end 7 they have first fixing means 12 cooperating with the first fixing means 12 of the wall element 4.

At least in the region of their front ends in which the second fixing means 13 are provided, the wall elements 4 and 5 can have in the region of their undersides a bar or limb 14 on which second fixing means are arranged.

As can be seen in particular from FIGS. 10, 11 and 13 the fixing means 13 of directly adjacent wall elements 4 and 5 cooperate by way of an intermediate member 15 for fixing the wall elements 4 and 5 in such a way that a movement of the two wall elements 4 and 5 relative to each other in their longitudinal direction is possible over a predetermined limited distance.

As shown in FIGS. 5, 6, 8 and 11 the bars 14 directed towards the oppositely disposed wall element have recesses 16, into which an engagement region 17 of the intermediate member 15 engages. The recess 16 extends around a projection 18 arranged at the front end of the bar, that is directed towards the immediately adjacent wall element. The projection is shaped projecting upwardly at the bottom of a depression in the region of the front end of the bar 14, the depression extending around the projection 18 forming the recess 16.

The projections 18 in the region of the mutually facing front ends of directly adjacent wall elements 4 and 5 engage into a through opening 19 in the intermediate member 15, that extends from the underside of the intermediate member 15 to the top side thereof. In this case the width of the through opening 19 in the longitudinal direction of the wall elements 4 and 5 is greater than the width occupied by the two projections 18 when the directly adjacent wall elements 4 and 5 bear against each other at the ends. The projections 18 also bear against each other when the mutually facing ends 6 and 7 of the directly adjacent wall elements 4 and 5 bear against each other.

The height of the projection 18 formed on the respective bar 14 corresponds to the length of the through opening 19 in the intermediate member 15 while the depth of the recess 16 extending around the projection 18 in the bar 14 corresponds to the height of the engagement region 17 extending around the through opening 19 in the intermediate member 15. The top sides of the projection 18, the engagement region 17 and the further regions of the bar 14 extending over the length of the wall element 4, 5 form a substantially continuous flat contact surface for the line.

For securing the intermediate member 15 to the mutually facing front end regions of the bars 14 of directly adjacent wall elements 4 and 5 the recesses 16 in the bars 14 extend partially into a region under the insides 9 of the wall elements 4 and 5, as can be seen from FIG. 3. The engagement region 17 of the intermediate member 15 engages into that region with a projection in the form of a spring tongue 20.

Figure 8:
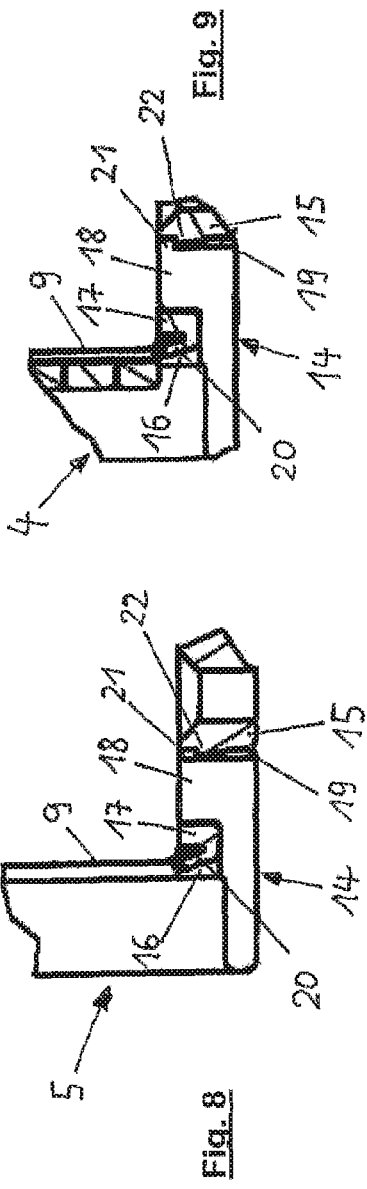
FIG. 8 shows an enlarged view of the portion VIII in FIG. 6.
Figure 9:
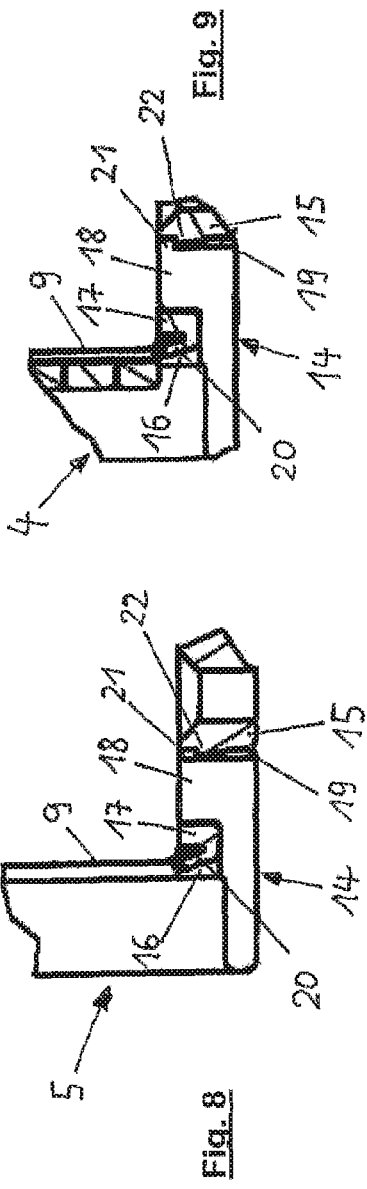
FIG. 9 shows an enlarged view of the portion IX in FIG. 7.

A latching connection is provided between the side of the projection 18 remote from the inside 9 of the wall element 4, 5, and the through opening 19 in the intermediate member 15. For that purpose, as shown in FIG. 8, at its side remote from the inside 9 of the wall element 4, 5, the projection 18 has a nose 21, under which latches a latching projection 22 provided in the through opening 19 upon fixing of the intermediate member 15 on the adjacent projections 18. The intermediate member 15 can thus be introduced in a suitably inclined position over the projections 18 of directly adjacent wall elements 4 and 5 with its projection which is in the form of the spring tongue 20, under the insides 9 of the wall elements 4 and 5, into the recesses provided in the bars 14, and then pivoted into the perpendicular to the wall element, in which case the latching projections 22 arranged in the through opening 19 latch under the noses 21 on the projections 18.

As can be seen in particular from FIGS. 10 to 13 the intermediate member 15 is in the form of an end region of an integral transverse member 23 connecting mutually opposite wall elements 4 and 5. The two end regions of the transverse member 23 therefore serve as an intermediate member 15 for connecting the second fixing means 13 of directly adjacent wall elements 4 and 5 in the oppositely disposed guide walls 2 and 3 of the guide device.

The first fixing means 12 at the other front end regions of the wall elements 4, 5, that serve for bearing against and play-free fixing of the wall elements 4 and 5 directly adjoining each other at said ends, are substantially of such a configuration, like the above-described second fixing means 13. As can be seen in particular from FIGS. 5, 7, 9 and 12 however in this case the width of the through opening 19 provided in the intermediate member 15 in the longitudinal direction of the wall elements 4 and 5 substantially corresponds exactly to the width occupied by the two projections 18 at the mutually opposite front end regions. Except for that difference the first fixing means 12 arranged there are the same as the second fixing means 13 arranged in the region of the other end.

As can be seen in particular from FIGS. 1, 3, 14 and 16 the second fixing means 13 further include in the relevant mutually adjoining front end regions of directly adjacent wall elements 4 and 5 cooperating groove-and-tongue means 25 which allow the directly adjacent wall elements 4 and 5 to move away from each other in the longitudinal direction thereof. The groove-and-tongue means 25 are arranged in the upper region of the wall elements 4 and 5 and supplement the above-described fixing means disposed in the bar 14 of the wall elements 4 and 5.

The groove-and-tongue means 25 are provided at the outside of the wall element 4 in the form of a plate-shaped element projecting in the longitudinal direction of the wall element and at the end 6 thereof and a groove which is arranged in the region of the end 6 of the wall element 5 at the outside thereof and which extends in the longitudinal direction of the wall element 5 and into which the plate-shaped element of the wall element 4 engages when the two wall elements 4 and 5 are fitted together. The groove is arranged in a part which is formed at the outside of the wall element 5 and which projects beyond same downwardly in the direction of the underside 11 of the wall element 5. The plate-shaped element on the wall element 4 has in its upper region directed towards the top side 10 of the wall element 4 a portion which engages as a tongue into the groove of the projecting part arranged on the wall element 5. Beneath that portion the plate-shaped element has an outwardly projecting bar, on which the projecting part lies in longitudinally displaceable relationship.

The first fixing means 12 which are provided at the other front end regions of the wall elements 4 and 5 and which include the above-described means arranged in the bars 1 have over the bars further means for play-free securing of a wall element 4, 5 bearing against the end in question. Like the means provided in the region of the bars 14 in that end region, said means serve to prevent separation of the directly adjacent wall elements 4 and 5 in question in their longitudinal direction and transversely relative thereto and to prevent pivotal movement of the wall elements relative to each other in any direction. As can be seen from FIGS. 14 and 16 the means are disposed at the outsides 8 of the wall elements 4 and 5. They are in the form of a projection 26 projecting at the end 7, having a latching region 27, and, in the region of the front end in question of the directly adjacent wall element they are in the form of a receiving region 28 for receiving the latching region 27. The receiving region 28 has a window-like opening 29, into which the latching region 27 of the projection 26 of the directly adjacent wall element 4, 5 engages.

The wall elements 4 and 5 over the entire height of their outside and inside, are of a substantially identical wall thickness. Their ends 6 and 7 are in the form of flat surfaces so that the end regions having the first fixing means 12 bear against each other with their ends 7 over the entire surface area, and the end regions of the wall elements 4 and 5, that have the second fixing means 13, can also bear against each other over their entire surface area with their other ends 6, by virtue of the play of the second fixing means 13.

The first fixing mean 12 and the second fixing means 13 which include the above-described means are arranged extending laterally outside the ends 6 and 7 and the insides and outsides of the wall elements 4 and 5, that serve to guide the line.

LIST OF REFERENCES 1 portion of a guide device
2 guide wall
3 guide wall
4 wall element
5 wall element
6 end
7 end
8 outside
9 inside
10 top side
11 underside
12 first fixing means
13 second fixing means
14 bar
15 intermediate member
16 recess
17 engagement region
18 projection
19 through opening
20 spring tongue
21 nose
22 latching projection
23 transverse member
24 projection
25 groove-and-tongue means
26 projection
27 latching region
28 receiving region
29 opening

What is claimed is:
1. A guide device for a line which is displaceable such that a first run thereof is positionable over a second run thereof and the first and the second runs are connected together by an arcuate portion, the guide device comprising:
laterally mutually opposite guide walls to guide the first and/or the second run,
each of the guide walls comprising a plurality of laterally mutually opposite wall elements extending in a longitudinal direction which are respectively formed in one piece from plastic and which respectively have
two ends facing away from each other in the longitudinal direction of the wall element,
an outside which faces away from the laterally mutually opposite wall element,
an inside which faces towards the laterally mutually opposite wall element and has a guide region for the line, and a top side and an underside narrower with respect to the outside and the inside, wherein at least two directly adjacent wall elements of the plurality of wall elements of at least one of the guide walls each have, at mutually facing front end regions, integrally formed fixing means which, without interposition of a further fixing means or with interposition of a further fixing means to fix the two directly adjacent wall elements to each other cooperate with each other such that the two directly adjacent wall elements are movable relative to each other in their longitudinal direction over a predetermined limited distance, wherein at least one of the fixing means comprises a projection and another of the fixing means comprises a recess or an opening, wherein the projection engages into the recess or opening, and wherein a width of the recess or opening in the longitudinal direction of the two directly adjacent wall elements is greater than a width of the projection in the longitudinal direction of the two directly adjacent wall elements such that the two directly adjacent wall elements are movable relative to each other in their longitudinal direction over the predetermined limited distance.

2. The guide device according to claim 1, wherein, at least at the mutually facing front end regions, the two directly adjacent wall elements have, in a region of their undersides, a respective bar at which the projection or the recess or opening is arranged.

3. The guide device according to claim 1, wherein the projection is arranged perpendicularly to the longitudinal direction of the wall element and parallel to the inside of the wall element.

4. The guide device according to claim 2, wherein the bar is arranged at a side of the wall element, that faces from the inside of the wall element into an interior of the guide device.

5. The guide device according to claim 1, wherein the fixing means integrally formed at the mutually facing front end regions of the two directly adjacent wall elements, respectively, are connected together in positively locking relationship by an intermediate member having the further fixing means such that the two directly adjacent wall elements are movable relative to each other in their longitudinal direction over the predetermined limited distance.

6. The guide device according to claim 2, further comprising an intermediate member having an engagement region, wherein the fixing means of one of the two directly adjacent wall elements comprises the projection, wherein the fixing means of another one of the two directly adjacent wall elements comprises another projection, wherein the projection of the fixing means of each of the two directly adjacent wall elements is arranged at a front end of the respective bar, that is directed towards the directly adjacent wall element, and a recess of each respective bar extends around the projections at a side facing towards the inside and away from an end of the wall element, into which the engagement region of the intermediate member engages.

7. The guide device according to claim 6, wherein the fixing means which comprises the recess or the opening is provided by the intermediate member, wherein the projections of the two directly adjacent wall elements engage into the recess, wherein the recess is provided at an underside of the intermediate member, or engage into the opening of the intermediate member, wherein the opening extends from the underside of the intermediate member to a top side thereof, wherein the width of the recess or the opening, provided by the intermediate member, in the longitudinal direction of the two directly adjacent wall elements is greater than a width occupied by the two projections when the two directly adjacent wall elements bear against each other at their ends.

8. The guide device according to claim 7, wherein a height of the projection formed on the respective bar corresponds to a depth of the recess at the underside of the intermediate member or a length of the opening extending from the underside of the intermediate member to the top side thereof, and a depth of the recess extending around the projection in the respective bar corresponds to a height of the engagement region extending around the recess in the intermediate member.

9. The guide device according to claim 6, wherein the recesses in the bars extend at least partially under the guide region of the insides of the wall elements and the engagement region of the intermediate member engages thereunder with an intermediate member projection.

10. The guide device according to claim 9, wherein the intermediate member projection is in the form of a spring tongue.

11. The guide device according to claim 7, wherein the intermediate member further comprises a latching projection arranged in the recess provided at the underside of the intermediate member or the opening of the intermediate member, wherein the projection arranged at the front end region of the respective bar has, at a side remote from the inside of the wall elements, a nose, under which the latching projection engages when the intermediate member is fixed on each of the projections.

12. The guide device according to claim 6, wherein the intermediate member is provided by an end region of a transverse member connecting the mutually opposite wall elements.

13. The guide device according to claim 1, wherein additional fixing means are provided at the mutually facing front end regions of the two directly adjacent wall elements, wherein the additional fixing means cooperating with the fixing means of the two directly adjacent wall elements in positively locking relationship such that the two directly adjacent wall elements are movable relative to each other in the longitudinal direction.

14. The guide device according to claim 13, wherein the additional fixing means comprises a groove-and-tongue means.

15. The guide device according to claim 1, wherein the fixing means for longitudinally displaceably securing the directly adjacent wall elements over a predetermined limited distance form second fixing means and provided at the mutually remote front end regions of the wall elements are integrally formed first fixing means which serve for bearing against and play-free securing at first fixing means of a wall element directly adjacent said front end.

16. The guide device according to claim 15, wherein the first fixing means are arranged to extend laterally outside the ends and the guide regions, serving to guide the line, of the insides of the wall elements.

17. The guide device according to claim 1, wherein the guide device accommodates an energy guide chain.

* * * * *